United States Patent [19]
Dutton

[11] Patent Number: 5,349,766
[45] Date of Patent: Sep. 27, 1994

[54] BOOM SUPPORT PENDANT PIN RETAINER

[75] Inventor: Vance D. Dutton, Marion, Ohio

[73] Assignee: Dresser Industries, Inc., Dallas, Tex.

[21] Appl. No.: 840,153

[22] Filed: Feb. 24, 1992

[51] Int. Cl.$^5$ ............................................. E02F 3/46
[52] U.S. Cl. ...................................... 37/397; 37/399; 37/396
[58] Field of Search .................. 37/116, 117, 115, 103, 37/135, 118 R, 395, 397, 396, 399, 401; 414/686, 722; 212/202, 186, 224, 253, 262

[56] References Cited

U.S. PATENT DOCUMENTS 3,959,899 6/1976 Rangaswamy ...................... 37/116
4,038,765 8/1977 Sankey et al. .

FOREIGN PATENT DOCUMENTS 257656 9/1926 United Kingdom .................. 37/116

Primary Examiner—Dennis L. Taylor
Assistant Examiner—J. Russell McBee
Attorney, Agent, or Firm—Vinson & Elkins

[57] ABSTRACT

A boom support pendant pin retainer for an earth working machine having a retainer plate and a projection for preventing rotational, axial and coaxial movement of the pendant pin. The projection is constructed and arranged to mesh in the void between the pendant pin and an adjacent opening in the gantry structure. The projection prevents rotational movement of the pendant pin and the retainer is secured to each end of the pendant pin and adjacent to the gantry, structure to prevent axial and coaxial movement of the pin.

10 Claims, 4 Drawing Sheets

BOOM SUPPORT PENDANT PIN RETAINER

BACKGROUND OF THE INVENTION

This invention relates to earth working machines having a support for a frame-mounted boom, and more particularly to a retainer for holding the boom support pendant pin in a fixed position.

Earth working machines such as dragline excavators generally include a boom pivotally mounted on one end of a frame that is raised to a boom operating position and mechanically held in that position by a boom support assembly.

Currently the boom support assemblies on dragline excavators utilize a gantry rising upwardly from the main frame to provide the support to the pivotally-mounted boom by means of tension members that are typically made out of wire rope, referred to herein as pendants, running from the top of the gantry out to the point of the boom. The boom point end of the pendants are attached directly to the point of the boom. The gantry end of the pendants are attached to a pendant linkage assembly having a throughbore for attachment to the top of the gantry. Typically, a dragline excavator will utilize two linkage assemblies with two pendants attached to each assembly.

At the top of the gantry there are projecting ears comprised of structural plates that have a double overlapping bore opening to receive the linkage assembly. The boom is raised until the linkage assemblies reach the top portion of the gantry structure and are adjacent to and coaxially aligned with the bores in the structural plates. A pendant pin is inserted through the bores and the linkage throughbore to hold the boom via the boom support assembly in its fixed operating position.

Referring to the prior art illustrations of FIGS. 2 and 3, a boom support assembly is generally designated by the reference numeral 20. During assembly of the boom, pendant pin 22 is inserted into bore 24, which diameter is larger than the diameter of pin 22 to ease assembly, and into the throughbore of the linkage assembly. The boom is then lowered into its operating position and the pin seats into the smaller bore 23, leaving a void 25. This pendant pin 22 must be retained in a fixed non-rotatable position to ensure that the cross-drilled lubrication hole 21 radial location is maintained away from the bending stress area of the pendant pin 22. Two retainers 26 are used to hold the pendant pin 22 in a fixed position. Retainers 26 having a plurality of bores 28 are placed against countersunk bores on the outward sides of the gantry plates 30 and against the exposed ends of the pendant pin 22. The outer diameter bores 28 align with threaded bores 32 in the gantry plates 30 and both aligned bores receive bolts 34 to hold the retainers 26 to the gantry plates 30. Inner diameter bores 27 align with threaded bores 36 in the ends of the pendant pin 22, and both aligned bores receive bolts 38 to hold the pin 22 and the retainers 26 together.

As shown in FIG. 3, retainers 26 prevent the pendant pin 22 from rotational, axial and coaxial movement, but the threaded bores 32 and the countersunk bores in gantry plates 30 produce stress concentrations in critical locations, weakening the structural gantry plates 30 themselves. Additionally, the use of boom support assembly 20 requires a great deal of machining on the retainers 26, gantry plates 30 and the pendant pin 22. This assemblage also requires additional parts (a large number of bolts) and requires time consuming assembly in the lining up of bores 28 on retainers 26 with the threaded bores 32 in the gantry plates 30, as well as bores 27 on the retainers 26 with the threaded bores 36 in the pendant pin 22.

SUMMARY OF THE INVENTION

In accordance with the present invention, the drawbacks of the prior art are addressed by an earth working machine that includes a frame, a gantry mounted on the frame, a boom pivotally mounted on the frame, and a boom support assembly. The boom support assembly includes pendant pin retainers having a projection adjacent to a face of the retainer. The projection is constructed and arranged to mesh in the void between the bore in the gantry structural plate and the side of the pendant pin. The pendant pin retainer with projection prevents rotational, axial and coaxial movement of the pendant pin without needing to machine bores into the sides of the gantry plates for attachment of the retainers.

Accordingly, it is an object of this invention to provide a boom support pendant pin retainer that prevents rotational, axial and coaxial movement of the pendant pin.

It is another object of this invention to provide a pendant pin retainer that is easy to set up and use, and is of relatively simple and economical design, manufacture and assembly.

It is a feature of this invention to have a projection adjacent to a face of a retainer that is constructed and arranged to mesh in the void between a side of the bore in the gantry plate and a side of the pendant pin.

It is an advantage of this invention to have a boom support pendant pin retainer that is easy to assemble and relieves stress concentrations on the gantry structural plate.

Other objects, features and advantages of the invention will be apparent in the following description and claims in which the invention is described, together with details to enable persons skilled in the art to practice the invention, all in connection with the best mode presently contemplated for the invention.

BRIEF DESCRIPTION OF THE DRAWINGS

The drawings accompanying the disclosure and the various views thereof may be briefly described as.

DETAILED DESCRIPTION OF THE INVENTION

Figure 1:
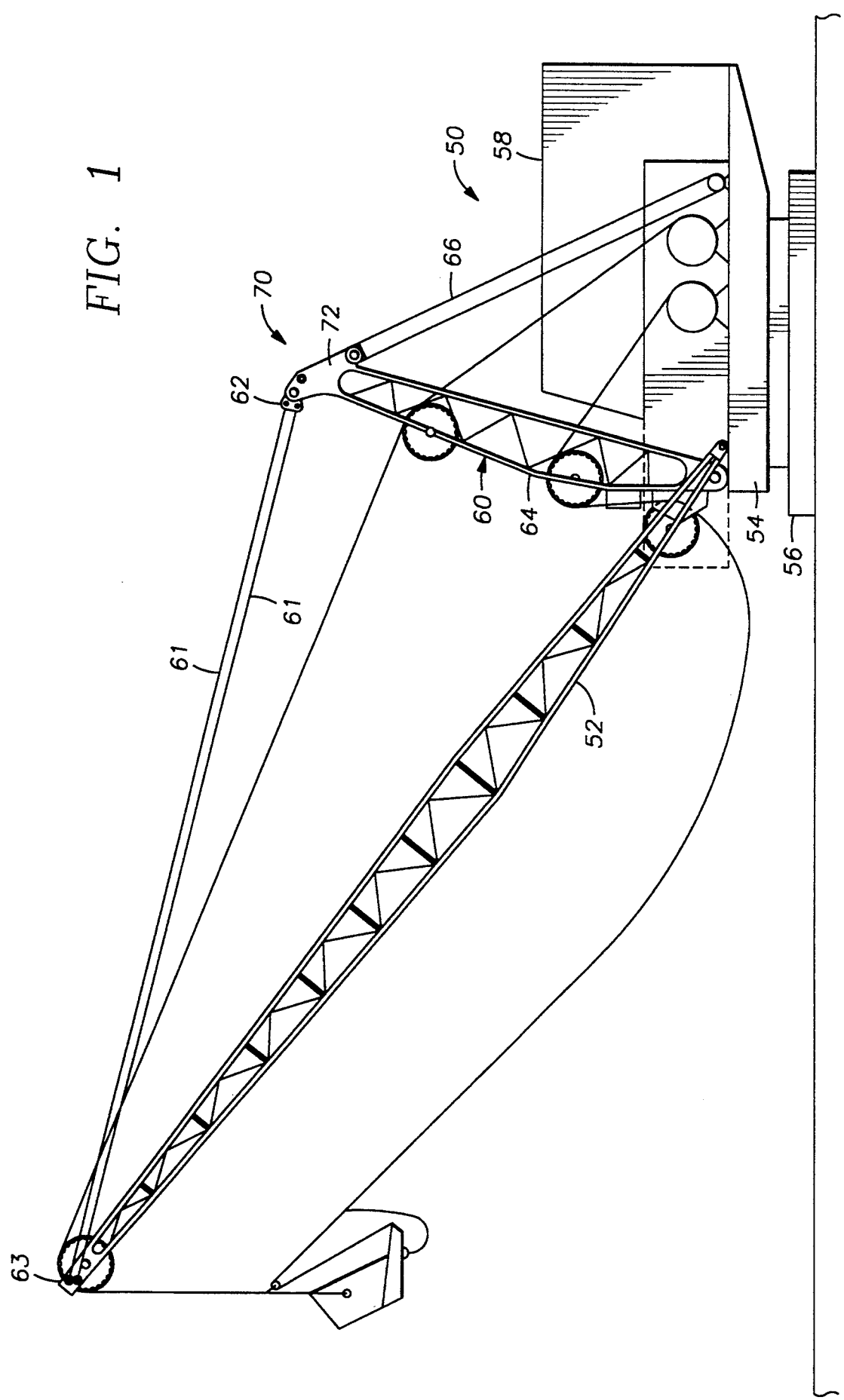
FIG. 1 is a side elevational view of a typical dragline excavator having a boom.
Figure 2:
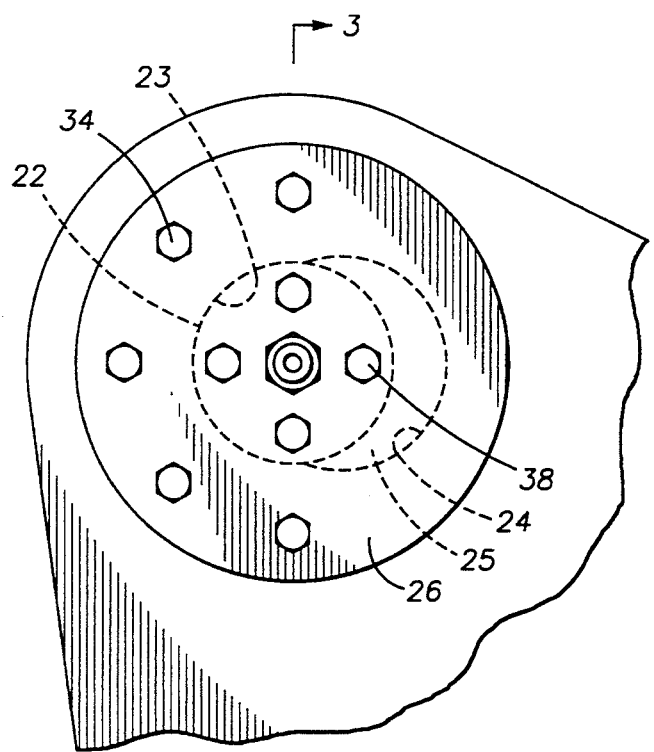
FIG. 2 is a partial side elevational view of a prior art boom support assembly.

The preferred embodiment of the present invention is illustrated by way of examples in FIGS. 1 and 4-6. With specific reference to FIG. 1, a dragline excavator 50 is illustrated with a boom 52 pivotally mounted to the main frame 54. The dragline excavator 50 is shown mounted on a base frame 56 located on the ground, but may also be mounted on a crawler unit. The excavator 50 includes the main frame 54 rotatably mounted on the base frame 56, a housing 58 on the main frame 54, an upwardly rising gantry 60, and a pendant linkage assembly 62.

The gantry 60 is a structure having front legs 64 and rear legs 66 attached to the main frame 54. The front legs 64 serve to transfer gantry boom loading to the main frame 54, while the rear legs 66 act as tension members for the gantry 60 structure. The front legs 64 and rear legs 66 are joined at the top by a bridge connector 70 which is made up of gantry plates 72. Pendants 61 are attached to the point of the boom 63 at one end and to the pendant linkage assembly 62 at the other end. The pendant linkage assembly 62 is held to the gantry 60 by receiving a pendant pin through a pin link bore in the gantry plates 72.

Figure 5:
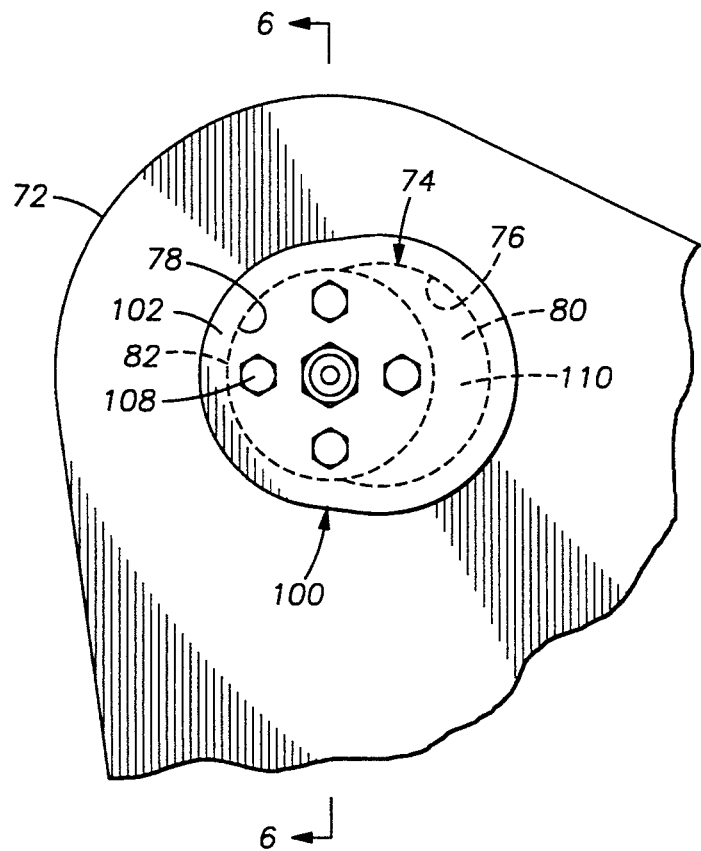
FIG. 5 is a partial side elevational view of the boom support assembly of the present invention.
Figure 6:
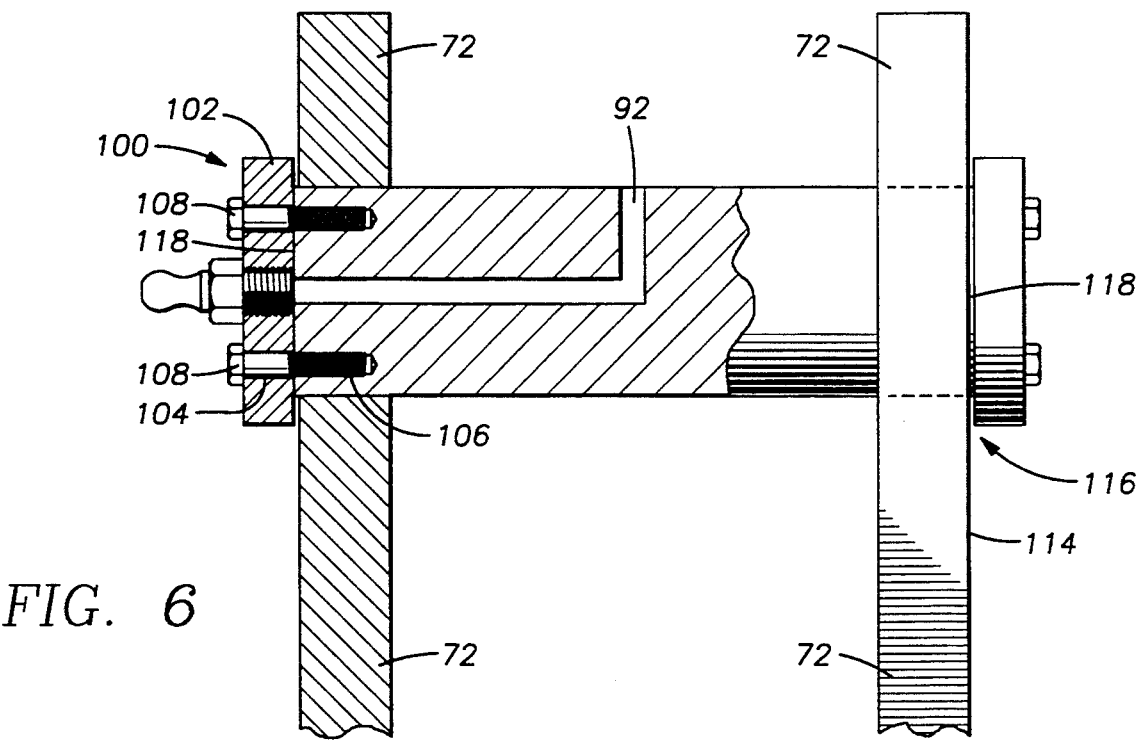
FIG. 6 is a partial sectional view of FIG. 5 along line 8—8.

Referring to FIGS. 5 and 6, each gantry plate 72 has a double overlapping bore opening 74 that comprises a larger bore 76 and an overlapping smaller bore 78 as shown in FIG. 5. The double bore opening 74 receives a boom support pendant pin 82 shown in FIG. 6. The pendant pin 82 is received through the larger bore 76 and seats in the smaller diameter bore 78 during excavator operation which leaves a void 80 between the pendant pin 82 and the side of the double bore opening 74. This void 80 is shown as a crescent in FIG. 5. The bore 76 is larger than the pin 82 diameter to allow case of assembly of the pendant pin 82, and for easier entry of the pendant pin 82 into a seating position in the smaller bore 78. This pendant pin 82 must be retained in a fixed non-rotatable position to ensure that the cross-drilled lubrication hole 92 radial location is maintained away from the bending stress area of the pendant pin 82.

Figure 4:
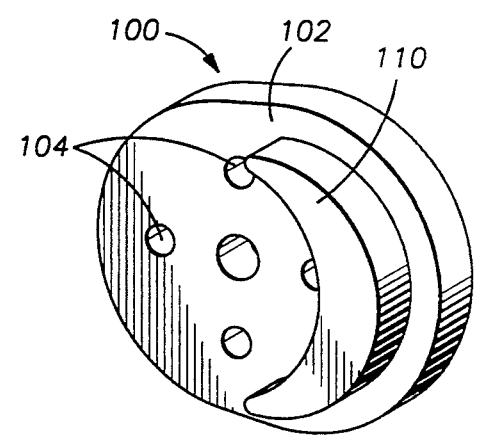
FIG. 4 is a perspective view of a boom support pendant pin retainer of the present invention.
Figure 3:
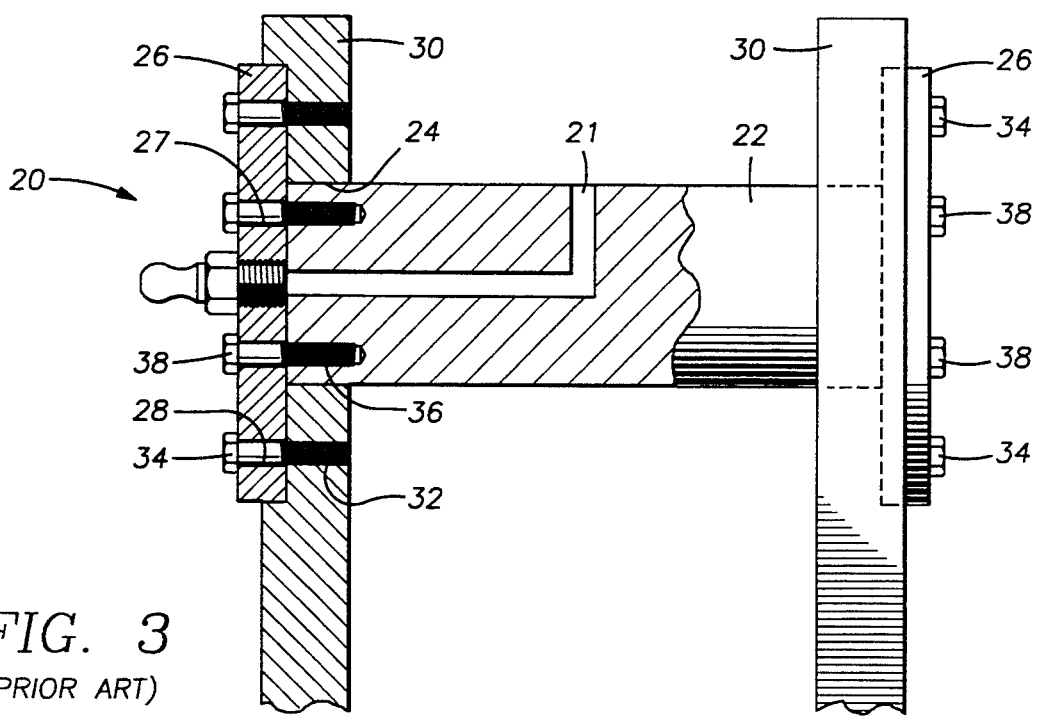
FIG. 3 is a partial sectional view of FIG. 2 along line 3—3.

A retainer 100, shown in FIG. 4, is used to prevent any movement of the pendant pin 82, including rotational and/or axial movement. As shown in FIG. 5 of the preferred embodiment, the retainer 100 includes a retainer plate 102 constructed and arranged to conform with the shape of the double bore opening 74, but large enough not to pass through the opening 74. Referring specifically to FIG. 6, the retainer plate 102 includes bores 104 that are aligned with threaded openings 106 of the pendant pin 82 for receiving retaining bolts 108. Additionally, shown perspectively in FIG. 4, a projection 110 projects from the inside face of the retainer plate 102. This projection 110 fills the void 80 in the large bore 76 adjacent to the pendant pin 82 as shown in FIG. 5. Therefore, the projection 110 is preferably crescent-shaped.

Referring to FIGS. 1, 4-6 to describe the operation of the present invention, the dragline excavator boom 52 is raised slightly above its operating position so that the pendant link 62 can be aligned with the opening of the larger diameter bore 76 so that the pendant pin 82 can be easily inserted through bore 76 into the throughbore (not shown) of the pendant link 62. The boom 52 is then lowered until the pin 82 seats into the smaller bore 78. Then a retainer 100 for each side of the pin 82 is placed over the end face 118 of the pendant pin 82. In this position, the retainer plate 102 is adjacent to the end face 118 of the pendant pin 82 having threaded openings 106 aligned with the bores 104 of the retainer 100. The length of pendant pin 82 is such that there is a small gap 116 between each outside face 114 of gantry plates 72 and each retainer plate 102. This small gap 116 ensures a tight fit of pendant pin 82 against retainers 100. Retainer bolts 108 are then passed through the bores 104 and threaded into the pin 82 to secure the retainer 100 to the pin 82. At the same time, the projecting projection 110 fills the void 80 that is adjacent the side of the pin 82 and the side of the large bore 76. As assembled, retainer 100 maintains pendant pin 82 in a fixed position by preventing rotational, axial and coaxial movement of pin 82.

Figure 8:
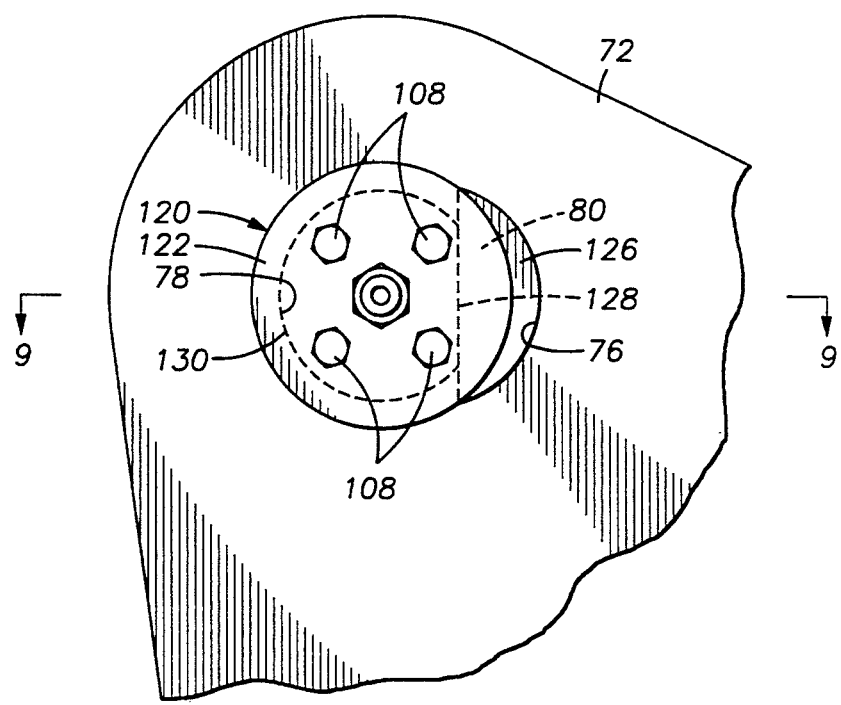
FIG. 8 is a partial side elevational view of the boom support assembly of an alternate embodiment of the present invention.
Figure 7:
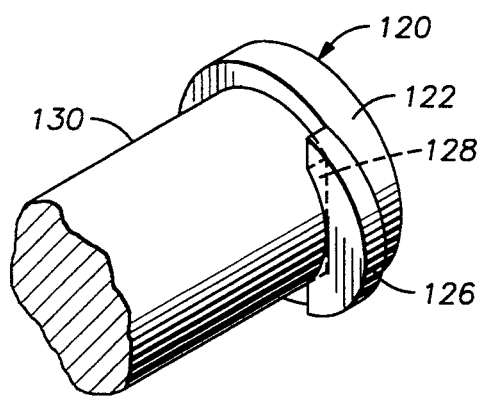
FIG. 7 is a perspective view of an alternate embodiment of the pendant pin retainer of the present invention.
Figure 9:
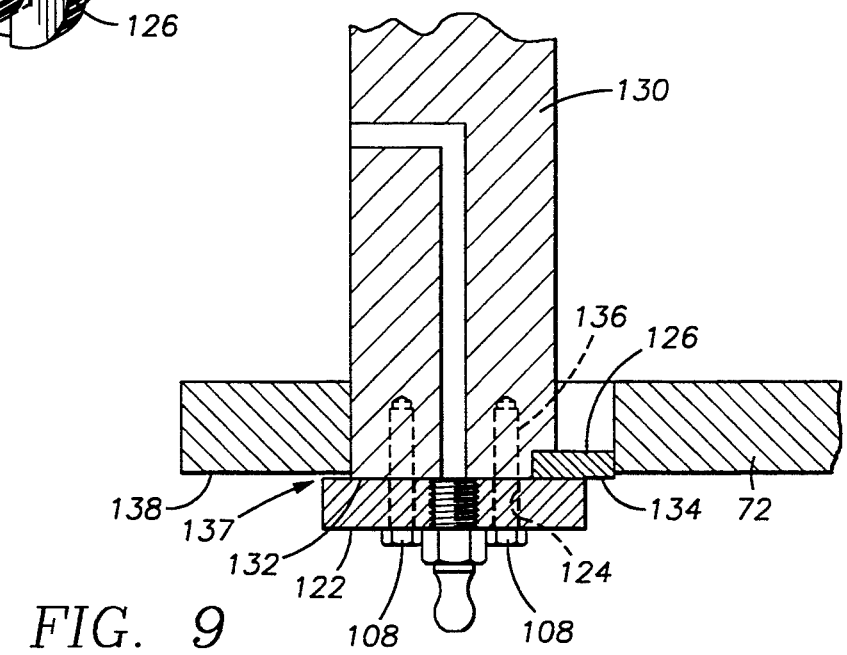
FIG. 9 is a partial sectional view of FIG. 8 along line 12—12.

A second embodiment of the present invention is illustrated in FIGS. 7-9. Specifically, FIGS. 7-9 show an embodiment of modified retainer 120 having a circular plate 122 having throughbores 124 and an unattached projection 126 having a semi-circular shape such as a Woodruff key. This modified retainer 120 requires that a flat notch 128 be machined onto each end of a pendant pin 130 to accommodate the Woodruff key offset 126 as shown in FIG. 7.

Referring to FIGS. 1, 7-9 for the operation of this alternate embodiment, the boom 52 must be raised up so that the pendant link 62 can receive the pendant pin 130 easily through the larger bore 76. The boom 52 is then lowered, and the pin 130 is seated into the smaller bore 78. The Woodruff key 126 is then interposed between the notch 128 and the void 80 to prevent rotational movement of the pin 130. The retainer plate 122 is then placed against the end face 132 of the pendant pin 130 and the outside face 134 of the Woodruff key 126 (see FIG. 9). Again, there is a small gap 137 between the retainer plate 122 and the outside face 138 of gantry plate 72. The throughbores 124 are aligned with threaded openings 136, and retaining bolts 108 are received through the bores 124 and into the threaded holes 136 of the pendant pin 130.

In this alternate embodiment, the retainer plates 122 prevent axial and coaxial pin movement, as well as confining the Woodruff key 126 that prevents rotational movement of the pendant pin 130. The use of projection 126 that is not attached to retainer plate 122 eliminates any rotational load or stress on the retainer bolts 108. Both the preferred and alternate embodiments reduce the machining necessary on the gantry plates 72, as well as on the retainers 100 and 120, and more importantly reduce stress concentrations in the gantry plates 72. Utilizing either of these embodiments provides easier and faster set-up and assembly.

It is to be understood that the terminology as employed in the description and claims incorporated herein is used by way of description and not by way of limitation, to facilitate understanding of the structure, function and operation of the combination of elements which constitute the present invention. Moreover, while the foregoing description and drawings illustrate in detail one successful working embodiment of the invention, to those skilled in the art to which the present invention relates, the present disclosure will suggest many modifications in the construction, as well as widely differing embodiments in applications without thereby departing from the spirit and scope of the invention. The present invention, therefore, is intended to be limited only by the scope of the appended claims and applicable prior art.

What is claimed is:

1. An earth working machine having:
   a frame;
   a gantry mounted on said frame;
   a boom pivotally mounted on said frame, said boom having a point to which a plurality of pendants are attached;
   a plurality of pendant pins for attaching said pendants to said gantry, said gantry having a plurality of openings for receiving said pins; and
   a plurality of retainers for preventing rotational, co-axial, and axial movement of said pendant pins, each said retainer comprising a retainer plate that is attachable to each end of said pendant pin, and a projection adjacent to an inside face of each said retainer plate, said projection constructed and arranged to be adjacent to a side of said pendant pin and a side of said opening in said gantry.

2. The earth working machine as set forth in claim 1, wherein each said retainer plate is larger than said gantry opening and has a plurality of bores aligned with a plurality of threaded openings on each end of said pendant pin, said bores and said threaded openings receiving a plurality of bolts so that each said retainer plate is securable to each end of said pendant pin.

3. The earth working machine as set forth in claim 1, wherein each said opening in said gantry includes a first bore overlapped by a smaller second bore.

4. The earth working machine as set forth in claim 3, wherein said projection meshes into a void between a side of said pendant pin and a side of said first bore.

5. The earth working machine as set forth in claim 3, wherein said pendant pin is cylindrical having a notch on each end, and said projection has a semi-circular shape with a flat side that is adjacent said notch of said pin and a side of said first bore.

6. The earth working machine as set forth in claim 5, wherein each said retainer plate is larger than said second bore to overlap said projection and has a plurality of bores aligned with a plurality of threaded openings on each end of said pendant pin, said bores and said threaded openings receiving a plurality of bolts so that each said retainer plate is securable to each end of said pendant pin.

7. The earth working machine as set forth in claim 1, wherein said projection is secured to said retainer plate.

8. A pendant pin retainer assembly having:
   a plurality of pendant pins, each of said pins having a plurality of threaded bores;
   a structure having a plurality of openings for receiving said pins, said openings include a first bore overlapped by a smaller second bore;
   a retainer plate having a plurality of bores for alignment with a plurality of threaded openings in each end of said pendant pins and said bores and said threaded openings receiving a plurality of bolts so that each said retainer plate is securable to each end of said pendant pins; and
   a projection adjacent to an inside face of said retainer plate, said projection constructed and arranged to be adjacent to a side of said pendant pins and a side of said first bore in said structure.

9. A pendant pin retainer assembly as set forth in claim 8, wherein said projection is secured to said retainer plate.

10. A pendant pin retainer assembly as set forth in claim 8, wherein each of said pendant pins is cylindrical having a notch on each end, and said projection has a semi-circular shape with a flat side that is adjacent said notch of said pins and a side of said first bore.

* * * * *